Oct. 12, 1943.     C. O. ADAMS     2,331,531
LAMINATED STRUCTURE
Filed July 2, 1941

INVENTOR
CHARLES O. ADAMS
BY
ATTORNEYS

Patented Oct. 12, 1943

2,331,531

UNITED STATES PATENT OFFICE 2,331,531

LAMINATED STRUCTURE

Charles O. Adams, Dayton, Ohio, assignor to General Motors Corporation, Detroit, Mich., a corporation of Delaware Application July 2, 1941, Serial No. 400,877

2 Claims. (Cl. 219—2)

This invention relates to an improved method of assembling laminated structures for electrical devices and particularly stators for electric motors.

It is among the objects of the present invention to secure together the stack of laminae forming a stator in such a manner that the scale coating on both sides of each lamina is maintained intact thereby insuring the complete insulating qualities of the scale between adjacent laminae.

A further object of the present invention is to secure together the stack of laminae forming a stator in such a manner as to prevent distortion of the assembled stator which results in both electrical and mechanical losses.

A still further object of the present invention is to rivet together the stack of laminae forming a stator. The rivets, passing through channels in the stack of laminae, are so treated and operated upon that only the end portions thereof are upset and swedged over to form clamping heads, the shanks or body portions of the rivets being maintained straight and in their original shape, substantially coaxial with the respective channels through which they pass thereby avoiding contact of the rivet with the inside surface of its respective channel.

Laminated structures for electrical devices and particularly laminated stators for electric motors have been assembled and held together in various ways. Sometimes the laminae are held together by threaded bolts, other laminae are clamped together between housing members of the respective device and still others are riveted together before being assembled in the device in which they are to be used.

The method of bolting the laminae together, either directly or between housing members of the device entails expensive processess particularly as to time of assembly and also complicates the introduction of the stator windings into their respective stator slots.

Riveting the stack of laminae together greatly reduces time of assembly and facilitates the placing of the windings in the slots of the assembled device. The usual manner of producing a laminated stator by the riveting process is as follows; the sheet metal from which the stator laminae are punched is first heat treated to produce a scale coating of an oxide character on both its surfaces, said scale coating providing an insulating layer between adjacent lamina of the stack forming the stator. The stacked laminae provide passages into which the rivets are inserted so that the head of the rivet engages and rests upon the one outer lamina of the stack. While the stack of laminae are held clamped together, each rivet is placed between pressure exerting members which, while the rivet is cold, will upset or swedge the one end into a head formation against the other outer lamina of the stack. In the production of a stator for a one horse-power electric motor or less, these rivets are somewhere around three sixteenths of an inch or less in diameter and an application of pressure of approximately six to eight tons is necessary to form a head on a cold rivet which will engage with and exert a clamping pressure upon its adjacent lamina to prevent relative slipping movement between the lamina in the stack. Such tremendous pressure exerted axially upon a rivet will not only upset or swedge its end portion into a head formation but it will also distort the entire length thereof, sometimes bending the body or shank portion of the rivet as shown in Fig. 3 of the drawing, so that portions thereof are pressed into tight engagement with the inner surface of the rivet receptive passage through the stack, and other times actually expanding the body portion of the rivet throughout its entire length so that it engages the complete inner surface of its passage. This necessary tremendous pressure will also distort the laminae in the stack out of their normal flat shape causing a relative sliding movement between the various laminae which causes an irregular outer contour and most undesirable of all an irregular central opening which is intended to receive the rotor of the motor so that a constant air gap therebetween may be had. Such distortion of the central opening requires an extra machine operation to provide a true circular opening in which the rotor of the motor may rotate.

The relative sliding movement between adjacent laminae of the rotor stack will tend to break down the insulating scale formation permitting an eddy current path to be set up which affects the efficiency of the motor. A motor to be of the highest efficiency should have its magnetic lines of force emanating directly from the inner peripheral edge of the stator laminae and not from the sides thereof or perhaps from the rivets themselves which would be the case when the body of the rivet is distorted so as to contact with the openings in the laminae through which said rivets extend.

Thus, one of the objects of the present invention, as has been stated, is to so treat and operate upon the end of the rivet that only said end is deformed to provide a clamping head, the body of the rivet being maintained substantially spaced from, and coaxial with, the stator bore through which it extends.

Further objects and advantages of the present invention will be apparent from the following description, reference being had to the accompanying drawing wherein a preferred embodiment of the present invention is clearly shown.

Figure 1:
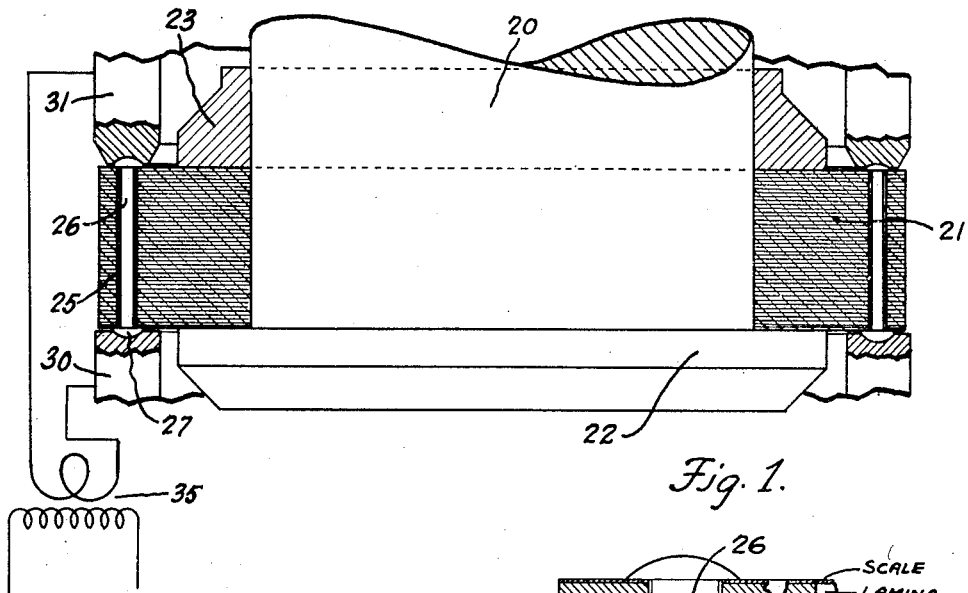
Fig. 1 is a diagrammatic view illustrating the improved methods of assembling a motor stator.
Figure 2:
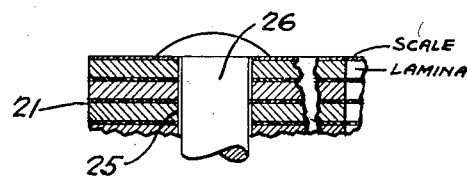
Fig. 2 is an enlarged, fragmentary section of a stator and one rivet assembled by the present method.
Figure 3:
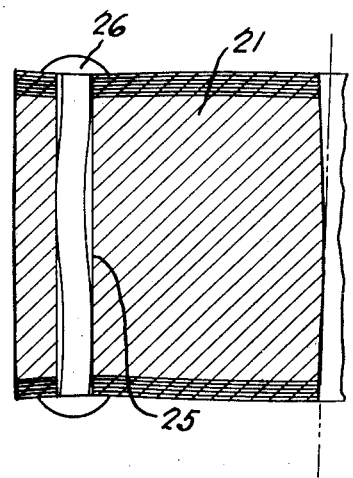
Fig. 3 is a fragmentary sectional view illustrating the undesirable results obtaining from improper assembly methods.

Referring to the drawing, the numeral 20 designates a core fixture adapted to fit snugly into the central opening of the laminae stack 21 forming the stator. This core 20 has a platform portion 22 upon which the stack of laminae may rest. A clamping ring 23, fitting about the core 20, is adapted to be moved to exert a predetermined clamping pressure upon the top of the laminae stack 21. Any suitable mechanism may be used to move ring 23 relatively to the core 20 and its platform base 22.

The stator stack usually provides a series of through passages or openings 25 arranged in a circular row. Each passage 25 has a rivet inserted therein, only one of which designated by the numeral 26, being shown in the diagrammatic Fig. 1. As shown, the body of the rivet 26 is of less transverse dimension than the opening 25 so that a clearance space is provided, the rivet not contacting with the edge of the opening of the various laminae, and a head 27 is provided on the rivet which engages the one outer lamina of the stack 21. The other end of the rivet extends beyond the confines of the stack.

An anvil-electrode 30 is provided which, in the complete machine is in the form of a ring the surface of which, adjacent the laminae stack 21, is provided with indents equal in number and spaced similarly to the rivets 26 so that each rivet head 27 may seat in an indent in ring 30 when the stator stack 21 is clamped upon the fixture.

Directly opposite the anvil-electrode 30 there is provided a ring shaped presser-electrode 31 which may have any suitable machinery attached thereto to move it toward the anvil-electrode 30. This presser-electrode 31 has a series of indents similar to anvil-electrode 30, each indent coaxially aligning with a respective rivet end extending from the stator laminae stack in the fixture. Electrodes 30 and 31 are connected to any suitable source of electrical energy 35 so that when the presser-electrode 31 is moved into engagement with the end of rivet 26 current will flow from one electrode, through the rivet to the other electrode. A current of approximately 15,000 amperes traverses this circuit and inasmuch as a good fitting and broad contact is had between the head 27 of the rivet 26 and electrode 30 while the contact between the end of the rivet 26 and electrode 31 is initially substantially a line contact, very narrow, more resistance to the flow of current at electrode 31 will consequently be had, therefore a much greater heating up of the end of the rivet at electrode 31 will obtain. The main body portion of the rivet being comparatively large and of slight resistance, heating thereof will be substantially confined to the extreme end, particularly so since the current flow, sufficient to heat the rivet to permit its end to be upset and swedged into a head formation requires the circuit to be closed only for a fraction of a second, this limited time practically preventing the heating up of any substantial portion of the main body of the rivet 26.

By electrically heating the end portion of the rivet 26 it becomes sufficiently ductile that only a pressure of approximately 500 pounds is necessary to upset and swedge this heated portion of the rivet into a head formation against the adjacent surface of the outer lamina of the stack. This comparatively small pressure of 500 pounds is insufficient to distort the main body of the rivet 26, maintained comparatively cool during this operation, thus said body portion will remain substantially coaxial with its respective passage in the stack of laminae and the space between the rivet and passage surface retained. The ductility of the heated end of the rivet not only requires less pressure to be applied to form a head, but also permits the application of pressure to be more completely controlled thereby substantially eliminating any disfiguration of the laminae out of their flat state. This practically prevents relative sliding movement of the various laminae and the consequent breaking down of the insulating scale as well as distortion of the inner and outer circular contours of the assembled stator all of which occur when the rivets are swedged or upset cold.

By maintaining the rivets coaxial of their respective passages, avoiding distortion of the various laminae and consequent breaking down of the insulating scale between adjacent laminae, eddy current paths are practically eliminated and consequently the full efficiency of the motor is attainable.

By this process all the undesirable features of the cold riveting process are eliminated and the stator laminae are held as rigidly together in assembled relation as by said cold riveting process. The time for assembling is somewhat reduced and the extra time required to machine the outer and inner peripheral surfaces of the assembly to eliminate irregularities due to distortion and consequent slippage is entirely avoided.

While the embodiment of the present invention as herein disclosed, constitutes a preferred form, it is to be understood that other forms might be adopted, all coming within the scope of the claims which follow.

What is claimed is as follows:

1. The method of producing low-eddy-current-loss induction motor stators and the like, comprising: providing a multiplicity of stator-component laminae of magnetic sheet material each having thereon a thin frangible electrically nonconductive coating and having therein a plurality of similarly located perforations, arranging said multiplicity of perforated coated laminae in the form of a stack having a high degree of interlaminal insulation and having a plurality of bores therethrough defined by registry of the several perforations of the component laminae, providing a plurality of stay rods each of greater length but no greater shank cross-section than the length and breadth, respectively, of a correspondent stack bore, freely disposing a stay rod in each stack bore with the terminal portions of each rod extended outwardly thereof, anchoring one terminal portion of each stay rod against the adjacent end face portion of the stack, momentarily locally heating and softening each other said terminal portion of each stay rod by passing a heavy electrical current thereto through a high-resistance contact therewith, and forging each of said thus-softened terminal rod portions into the form of a head bearing upon the adjacent end face portion of the laminated stack with a light pressure sufficient to compact and immobilize said stator-component laminae relative to one another but insufficient to set up therein localized stresses capable of effecting fracture of their respective coatings and impairment of the high interlaminal stack insulation provided thereby.

2. The method of producing low-eddy-current-loss induction motor stators and the like, comprising: providing a multiplicity of stator-component laminae of magnetic sheet material each having thereon a thin frangible electrically non-conductive coating and having therein a plurality of similarly located perforations, arranging said multiplicity of perforated coated laminae in the form of a stack having a high degree of interlaminal insulation and having a plurality of bores therethrough defined by registry of the several perforations of the component laminae, providing a plurality of stay rods each of greater length and materially lesser shank cross section than the length and breadth, respectively, of a correspondent stack bore, disposing a stay rod in each stack bore in spaced relation to the wall thereof and with the terminal portions of each rod extended outwardly thereof, anchoring one terminal portion of each stay rod against the adjacent end face portion of the stack, momentarily locally heating and softening each other said terminal portion of each stay rod by passing a heavy electrical current thereto through a high-resistance contact therewith, and forging each of said thus-softened terminal portions of said bore-spaced rods into the form of a head bearing upon the adjacent end face portion of the laminated stack with a light pressure sufficient to compact and immobilize said stator-component laminae relative to one another but insufficient either to buckle the shank of the stay rod or to set up in said component laminae localized stresses capable of effecting fracture of their respective coatings and impairment of the high interlaminal stack insulation provided thereby.

CHARLES O. ADAMS.